US012590744B2

(12) United States Patent　　　　　(10) Patent No.: US 12,590,744 B2
　　Gongate　　　　　　　　　　　　　　(45) Date of Patent: Mar. 31, 2026

(54) REDUCTION OF POWER CONSUMPTION IN TRANSPORT REFRIGERATION UNIT

(71) Applicant: Carrier Corporation, Palm Beach Gardens, FL (US)

(72) Inventor: Suzankumar Danaiah Gongate, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 222 days.

(21) Appl. No.: 18/354,175

(22) Filed: Jul. 18, 2023

(65) Prior Publication Data

US 2024/0027117 A1　　　Jan. 25, 2024

Related U.S. Application Data

(60) Provisional application No. 63/391,440, filed on Jul. 22, 2022.

(51) Int. Cl.
　　*F25B 49/02*　　　　(2006.01)
　　*B60H 1/00*　　　　(2006.01)
(52) U.S. Cl.
　　CPC ....... *F25B 49/027* (2013.01); *B60H 1/00264* (2013.01); *B60H 1/00764* (2013.01); *F25B 2500/18* (2013.01); *F25B 2600/111* (2013.01); *F25B 2700/15* (2013.01)

(58) Field of Classification Search
　　CPC ............... B60H 1/00264; F25B 49/027; F25B 2600/11; F25B 2600/111; F25B 2700/15
　　See application file for complete search history.

(56) References Cited

U.S. PATENT DOCUMENTS

| 2014/0023557 A1* | 1/2014 | Tian .................. G01N 33/0027 |
| | | 422/88 |
| 2018/0044863 A1* | 2/2018 | Gamble, II .......... E01C 19/203 |
| 2018/0319247 A1* | 11/2018 | Gotmalm .......... B61D 27/0027 |

OTHER PUBLICATIONS

Kedia, Sunil; "Running a Brush DC Motor as a Generator" Portescap, White Paper, Aug. 10, 2021, 5 Pages.

* cited by examiner

*Primary Examiner* — Jonathan Bradford
(74) *Attorney, Agent, or Firm* — CANTOR COLBURN LLP

(57) ABSTRACT

A method for controlling power to a condenser fan of a transport refrigeration unit (TRU) includes disconnecting power to the condenser fan; detecting a fan voltage produced by back emf of the condenser fan; obtaining an input volume flow rate corresponding to airflow over a condenser in response to the fan voltage; comparing the input volume flow rate to a lower limit volume flow rate; disconnecting power to the condenser fan when the input volume flow rate is greater than the lower limit volume flow rate.

11 Claims, 9 Drawing Sheets

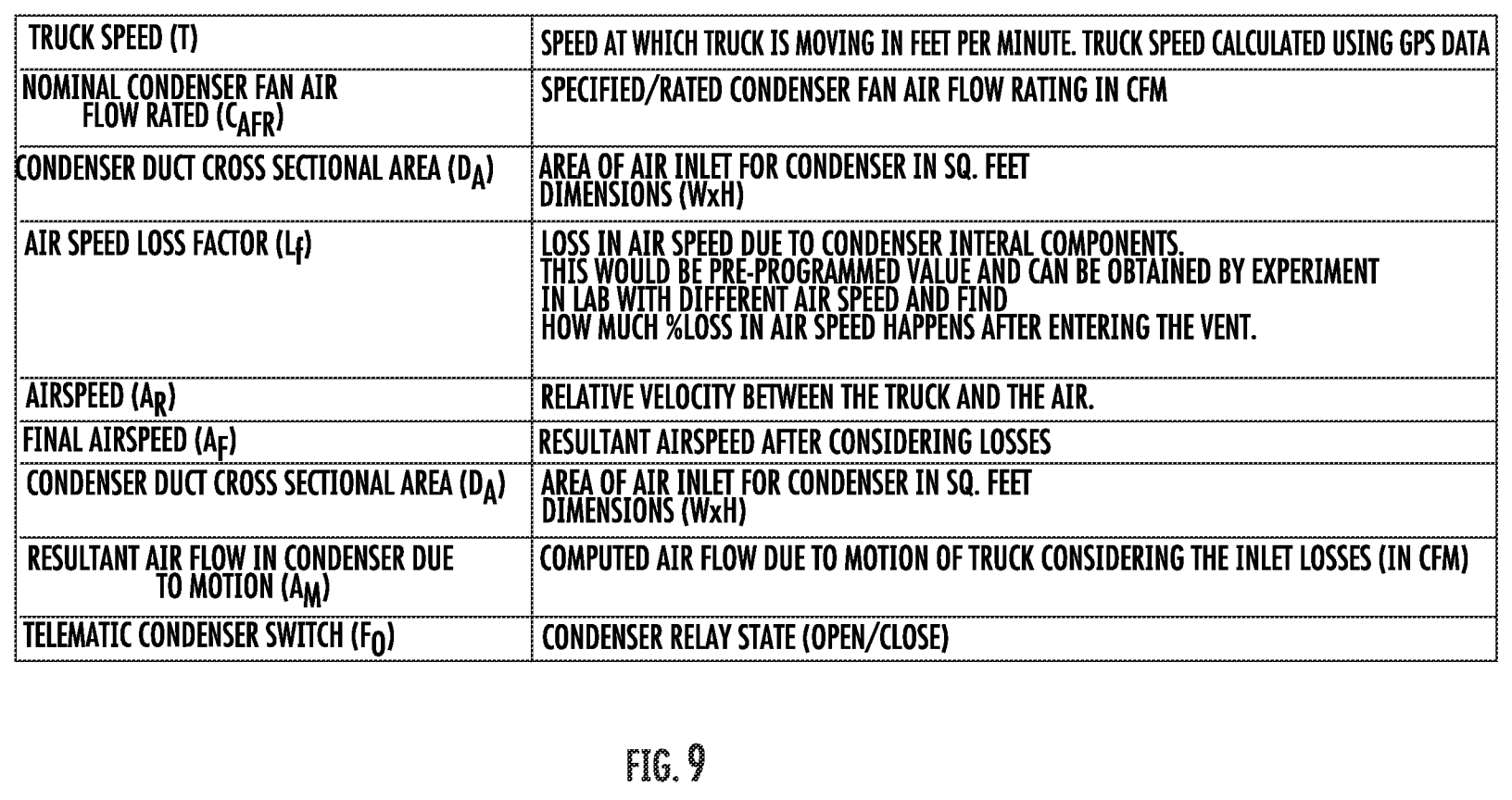

| | |
|---|---|
| TRUCK SPEED (T) | SPEED AT WHICH TRUCK IS MOVING IN FEET PER MINUTE. TRUCK SPEED CALCULATED USING GPS DATA |
| NOMINAL CONDENSER FAN AIR FLOW RATED ($C_{AFR}$) | SPECIFIED/RATED CONDENSER FAN AIR FLOW RATING IN CFM |
| CONDENSER DUCT CROSS SECTIONAL AREA ($D_A$) | AREA OF AIR INLET FOR CONDENSER IN SQ. FEET DIMENSIONS (WxH) |
| AIR SPEED LOSS FACTOR ($L_f$) | LOSS IN AIR SPEED DUE TO CONDENSER INTERAL COMPONENTS. THIS WOULD BE PRE-PROGRAMMED VALUE AND CAN BE OBTAINED BY EXPERIMENT IN LAB WITH DIFFERENT AIR SPEED AND FIND HOW MUCH %LOSS IN AIR SPEED HAPPENS AFTER ENTERING THE VENT. |
| AIRSPEED ($A_R$) | RELATIVE VELOCITY BETWEEN THE TRUCK AND THE AIR. |
| FINAL AIRSPEED ($A_F$) | RESULTANT AIRSPEED AFTER CONSIDERING LOSSES |
| CONDENSER DUCT CROSS SECTIONAL AREA ($D_A$) | AREA OF AIR INLET FOR CONDENSER IN SQ. FEET DIMENSIONS (WxH) |
| RESULTANT AIR FLOW IN CONDENSER DUE TO MOTION ($A_M$) | COMPUTED AIR FLOW DUE TO MOTION OF TRUCK CONSIDERING THE INLET LOSSES (IN CFM) |
| TELEMATIC CONDENSER SWITCH ($F_0$) | CONDENSER RELAY STATE (OPEN/CLOSE) |

FIG. 9

REDUCTION OF POWER CONSUMPTION IN TRANSPORT REFRIGERATION UNIT

CROSS-REFERENCE TO RELATED APPLICATIONS

This application claims the benefit of U.S. Provisional Application No. 63/391,440 filed Jul. 22, 2022, which is incorporated herein by reference in its entirety.

BACKGROUND

Exemplary embodiments of this disclosure pertain to transport refrigeration units, and more specifically, to reducing power consumption in transport refrigeration units.

Transport refrigeration units (TRUs) for trucks, trailers or containers may be powered by various technologies. Existing TRUs use a fuel-powered generator to produce electricity to power various components of the TRU, such as a compressor, condenser fan, evaporator fan, etc. TRUs can also be "engineless" and use batteries to power various components of the TRU. Regardless of the power source, it is beneficial to reduce power consumption of the TRU.

SUMMARY

According to an embodiment, a transport refrigeration unit includes a method for controlling power to a condenser fan of a transport refrigeration unit (TRU) including disconnecting power to the condenser fan; detecting a fan voltage produced by back emf of the condenser fan; obtaining an input volume flow rate corresponding to airflow over a condenser in response to the fan voltage; comparing the input volume flow rate to a lower limit volume flow rate; disconnecting power to the condenser fan when the input volume flow rate is greater than the lower limit volume flow rate.

In addition to one or more of the features described herein, or as an alternative, further embodiments may include connecting power to the condenser fan when the input volume flow rate is not greater than the lower limit volume flow rate.

In addition to one or more of the features described herein, or as an alternative, further embodiments may include setting a timer after connecting power to the condenser fan; upon expiration of the timer, repeating the disconnecting, detecting, obtaining and comparing.

In addition to one or more of the features described herein, or as an alternative, further embodiments may include wherein the lower limit volume flow rate is computed from a reference voltage.

In addition to one or more of the features described herein, or as an alternative, further embodiments may include wherein the lower limit volume flow rate is stored in a memory.

According to another embodiment, a system for controlling power to a condenser fan of a transport refrigeration unit (TRU) includes a condenser fan relay configured to supply power to the condenser fan; a switch in electrical series with the condenser fan relay and the condenser fan; a controller, the controller configured to perform operations including: disconnecting power to the condenser fan by opening the switch; detecting a fan voltage produced by back emf of the condenser fan; obtaining an input volume flow rate corresponding to airflow over a condenser in response to the fan voltage; comparing the input volume flow rate to a lower limit volume flow rate; disconnecting power to the condenser fan by opening the switch when the input volume flow rate is greater than the lower limit volume flow rate.

In addition to one or more of the features described herein, or as an alternative, further embodiments may include wherein the controller is further configured to close the switch connecting power to the condenser fan when the input volume flow rate is not greater than the lower limit volume flow rate.

In addition to one or more of the features described herein, or as an alternative, further embodiments may include wherein the controller is further configured to: set a timer after connecting power to the condenser fan; upon expiration of the timer, repeating the disconnecting, detecting, obtaining and comparing.

In addition to one or more of the features described herein, or as an alternative, further embodiments may include wherein the lower limit volume flow rate is computed from a reference voltage.

In addition to one or more of the features described herein, or as an alternative, further embodiments may include wherein the lower limit volume flow rate is stored in a memory of the controller.

According to another embodiment, a computer program is embodied on a computer-readable storage medium, the computer program including instructions for causing a processor to implement a process for controlling power to a condenser fan of a transport refrigeration unit (TRU), the process including disconnecting power to the condenser fan; detecting a fan voltage produced by back emf of the condenser fan; obtaining an input volume flow rate corresponding to airflow over a condenser in response to the fan voltage; comparing the input volume flow rate to a lower limit volume flow rate; disconnecting power to the condenser fan when the input volume flow rate is greater than the lower limit volume flow rate.

According to another embodiment, a method for controlling power to a condenser fan of a transport refrigeration unit (TRU) includes connecting power to the condenser fan; using a telematics device to obtain GPS data for the TRU; calculating a speed of travel of the TRU in response to the GPS data; determining a resultant air flow in condenser due to motion ($A_M$) in response to the speed of travel of the TRU; comparing the resultant air flow in condenser due to motion ($A_M$) to a nominal condenser fan air flow rating, $C_{AFR}$; disconnecting power to the condenser fan when the resultant air flow in condenser due to motion ($A_M$) is greater than or equal to the nominal condenser fan air flow rating, $C_{AFR}$.

In addition to one or more of the features described herein, or as an alternative, further embodiments may include connecting power to the condenser fan when the resultant air flow in condenser due to motion ($A_M$) is not greater than or equal to than the nominal condenser fan air flow rating, $C_{AFR}$.

According to another embodiment, a system for controlling power to a condenser fan of a transport refrigeration unit (TRU) includes at least one of a switch and a condenser fan relay configured to connect the condenser fan to power; a telematics device to obtain GPS data for the TRU; a controller configured to open and close the condenser fan relay; wherein at least one of the controller and the telematics device is configured to perform operations including: connecting power to the condenser fan; obtaining GPS data for the TRU; calculating a speed of travel of the TRU in response to the GPS data; determining a resultant air flow in condenser due to motion ($A_M$) in response to the speed of travel of the TRU; comparing the resultant air flow in condenser due to motion $(A_M)$ to a nominal condenser fan air flow rating, $C_{AFR}$; disconnecting power to the condenser fan through at least one of the switch and the condenser fan relay when the resultant air flow in condenser due to motion $(A_M)$ is greater than or equal to the nominal condenser fan air flow rating, $C_{AFR}$.

In addition to one or more of the features described herein, or as an alternative, further embodiments may include wherein at least one of the controller and the telematics device is configured to perform operations including: connecting power to the condenser fan through at least one of the switch and the condenser fan relay when the resultant air flow in condenser due to motion $(A_M)$ is not greater than or equal to than the nominal condenser fan air flow rating, $C_{AFR}$.

According to another embodiment, a computer program is embodied on a computer-readable storage medium, the computer program including instructions for causing a processor to implement a process for controlling power to a condenser fan of a transport refrigeration unit (TRU), the process including connecting power to the condenser fan; using a telematics device to obtain GPS data for the TRU; calculating a speed of travel of the TRU in response to the GPS data; determining a resultant air flow in condenser due to motion $(A_M)$ in response to the speed of travel of the TRU; comparing the resultant air flow in condenser due to motion $(A_M)$ to a nominal condenser fan air flow rating, $C_{AFR}$; disconnecting power to the condenser fan when the resultant air flow in condenser due to motion $(A_M)$ is greater than or equal to the nominal condenser fan air flow rating, $C_{AFR}$.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following descriptions should not be considered limiting in any way.

FIG. 9 depicts parameters used in the control process of FIG. 8 in an example embodiment.

DETAILED DESCRIPTION

A detailed description of one or more embodiments of the disclosed apparatus and method are presented herein by way of exemplification and not limitation with reference to the Figures.

Figure 1:
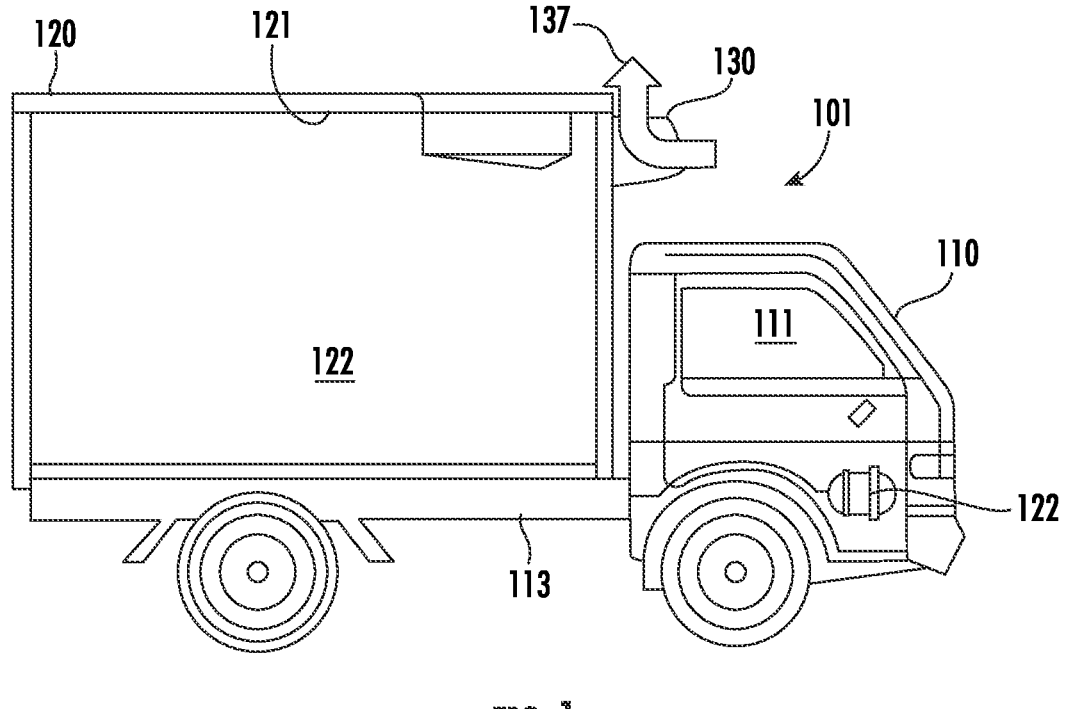
FIG. 1 is a side view of a truck/trailer with a transport refrigeration unit (TRU) in an example embodiment.
Figure 2:
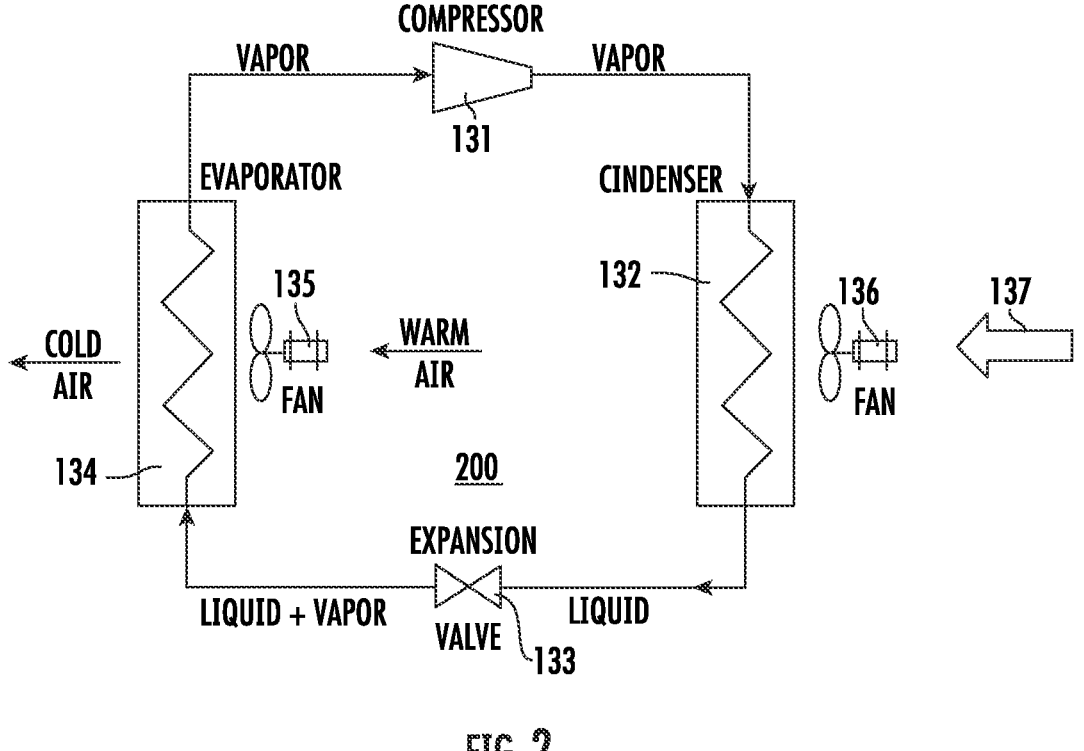
FIG. 2 is a schematic illustration of a vapor compression cycle of the TRU of FIG. 1 in an example embodiment.

With reference to FIGS. 1 and 2, a truck 101 includes a vehicle portion 110, a trailer portion 120 and a TRU 130. The vehicle portion 110 includes a cabin 111, which is supportive of an engine 112 and which is configured to accommodate an operator and one or more passengers, and a bed 113 in the rear of the cabin 111. In some cases, the engine 112 can be a diesel engine or another similar type of internal combustion engine. The trailer portion 120 can be seated on the bed 113 and has a body 121 that is formed to define an interior 122 in which items being transported or shipped can be stored. The TRU 130 is operably coupled directly or indirectly to, and is configured to be seated upon, the body 121 of the trailer portion 120.

The TRU 130 is configured to generate a cooling (or heating) airflow that can be directed into the interior 122 so as to control at least a temperature of the interior 122. In this way, in an exemplary case in which the items being transported are perishable and need to be refrigerated (or heated), the TRU 130 can maintain the interior 122 in a refrigerated (or heated) state even during hot (or cold) days.

Although FIG. 1 shows a truck-mounted TRU 130, embodiments of this disclosure are also applicable to TRUs mounted to containers. Embodiments of this disclosure should not be limited to TRUs on trucks/trailers.

As shown in FIG. 2, the TRU 130 can be operated according to a vapor compression cycle and includes a compressor 131, a condenser 132, an expansion valve 133, an evaporator 134, evaporator fan 135 and condenser fan 136. The compressor 131 compresses refrigerant vapor and outputs the compressed refrigerant vapor to the condenser 132. Within the condenser 132, the compressed refrigerant vapor is condensed into a liquid, while the condenser fan 136 blows air over and through the condenser 132. Liquid refrigerant exiting the condenser 132 is directed to the expansion valve 133. The liquid refrigerant is expanded through the expansion valve 133 into a mixture of liquid and vapor that is directed to the evaporator 134. The mixture of liquid and vapor refrigerant then flows through coils of the evaporator 134 while the evaporator fan 135 blows air over the evaporator 134 whereupon the refrigerant evaporates and removes heat from the air. This cools the air so that the air can be directed into the interior 122 as cooled air. The refrigerant vapor is then proceeds to the suction port of the compressor 131.

FIGS. 1 and 2 show airflow 137 that travels over the condenser 132. Under certain conditions, forward movement of the TRU 130 provides sufficient airflow over the condenser 132 so that the condenser fan 136 does not need to operate. Also, wind can provide sufficient airflow over the condenser 132 so that the condenser fan 136 does not need to operate. Embodiments of this disclosure describe methods and systems to remove power from the condenser fan 136 to reduce power consumption of the TRU 130.

Figure 3:
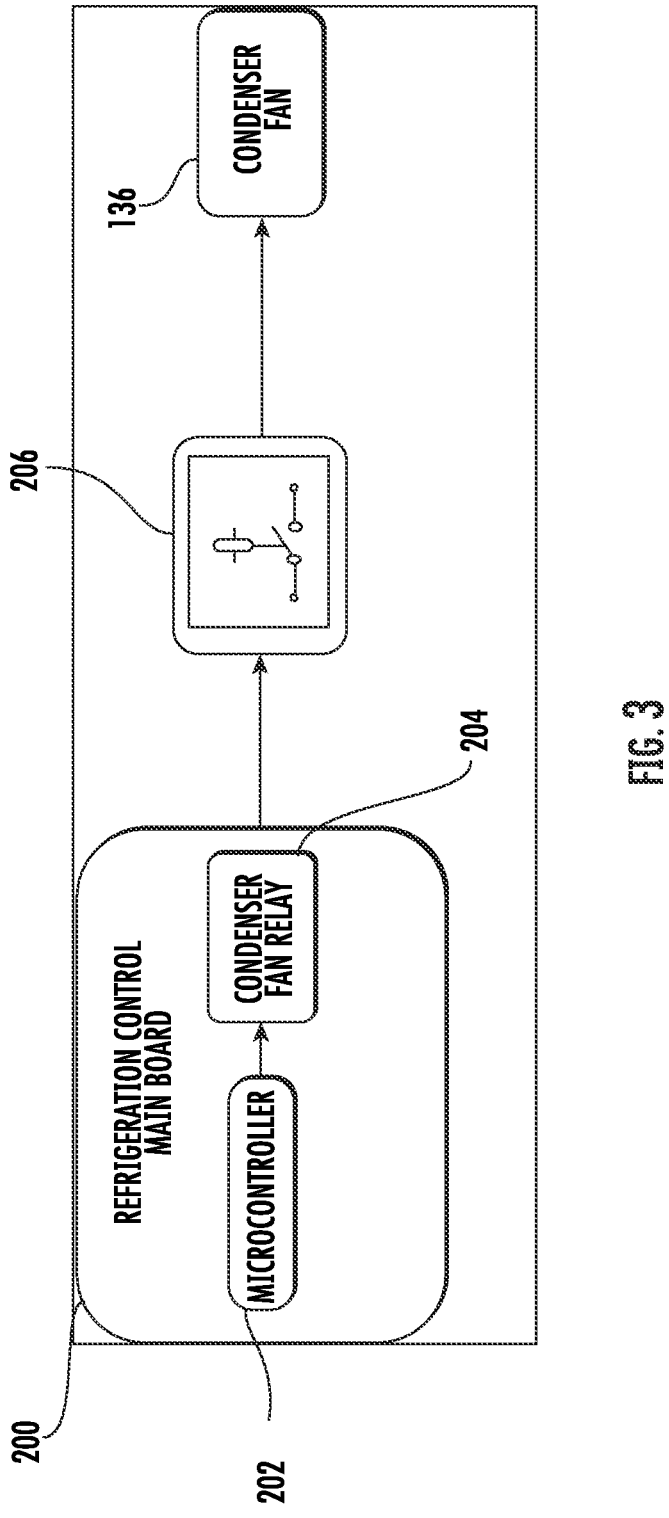
FIG. 3 depicts a system for controlling power to a condenser fan in an example embodiment.

FIG. 3 depicts a system for controlling power to the condenser fan 136. A TRU control board 200 includes a controller 202 and a condenser fan relay 204. Controller 202 may be implemented using a general-purpose microprocessor executing a computer program stored on a storage medium to perform the operations described herein. Alternatively, controller 202 may be implemented in hardware (e.g., ASIC, FPGA) or in a combination of hardware/software. The controller 202 controls power to the condenser fan 136 by opening or closing the condenser fan relay 204.

Figure 4:
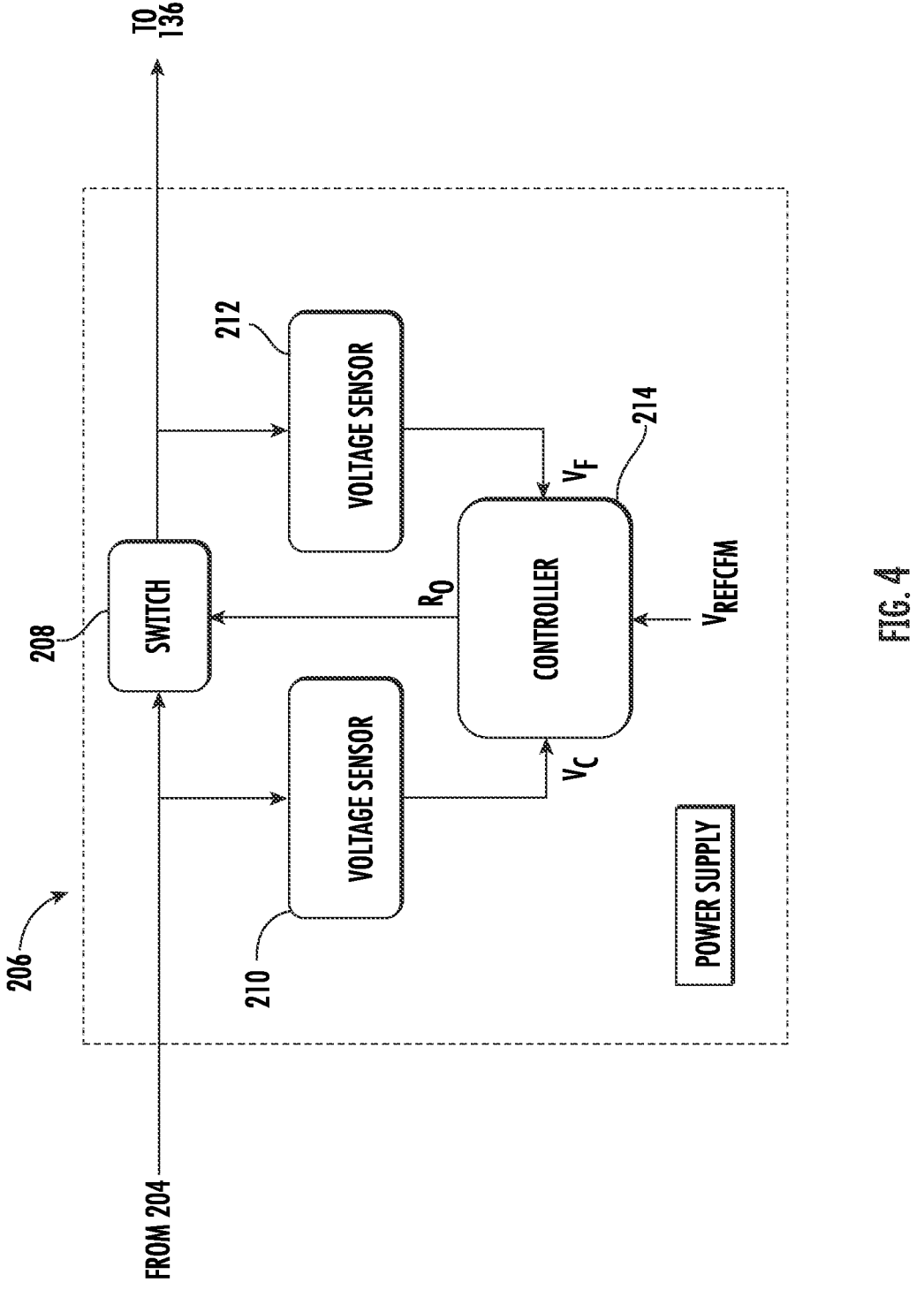
FIG. 4 depicts a switching unit in an example embodiment.

A switching unit 206 is positioned in electrical series between the condenser fan relay 204 and the condenser fan 136. FIG. 4 depicts the switching unit 206 in further detail. The switching unit 206 includes a switch 208, which may be a relay. A first voltage sensor 210 detects a supply voltage, Vc, output by the condenser fan relay 204. A second voltage sensor 212 detects a fan voltage, $V_F$, generated by the condenser fan 136. The fan voltage, $V_F$, is a back emf voltage produced by the condenser fan 136. When the truck 101 is moving, or there is a breeze, the condenser fan 136 can act as a generator when fan blades rotate due to airflow, producing the fan voltage, $V_F$. A controller 214 receives the supply voltage and the fan voltage and opens or closes the switch 208 based on the supply voltage and the fan voltage. The controller 214 may be implemented using a general-purpose microprocessor executing a computer program stored on a storage medium to perform the operations described herein. Alternatively, the controller 214 may be implemented in hardware (e.g., ASIC, FPGA) or in a combination of hardware/software. The controller 214 may be implemented by controller 202, so that only a single controller is present. The controller 214 stores a reference voltage, VRefcfm, which corresponds to a lower limit of airflow over the condenser 132.

Figure 5:
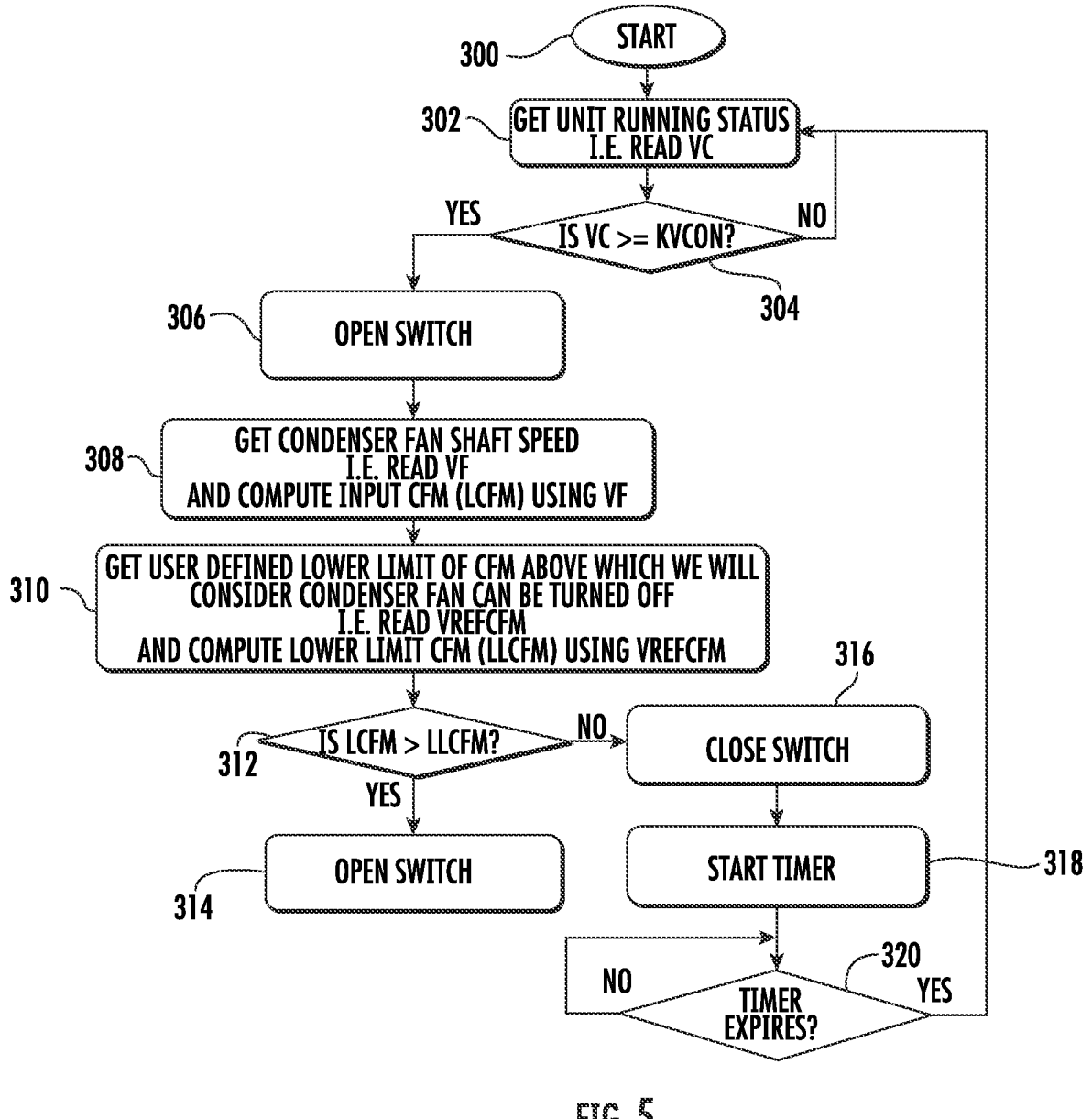
FIG. 5 is a flowchart of a process for controlling power to a condenser fan in an example embodiment.

FIG. 5 is a flowchart of a process for controlling power to the condenser fan 136. The process may be performed by controller 214. The process begins at 300 and flows to 302 where the controller 214 detects the supply voltage, $V_C$. At 304, the controller 214 determines if the supply voltage, $V_C$, is greater than or equal to a threshold voltage, KVcon. The threshold voltage, KVcon, represents a voltage supplied by the condenser fan relay 204 when the TRU control board 200 commands the condenser fan 136 to operate. If the supply voltage, VC, is not greater than or equal to a threshold voltage, KVcon, then there is no power being supplied to the condenser fan 136, and the process returns to 302.

If at 304, the supply voltage, VC, is greater than or equal to a threshold voltage, KVcon, the process flows to 306. At 306, the controller 214 sends a control signal, Ro, to the switch 208 to open the switch 208. This disconnects the condenser fan 136 from the condenser fan relay 204.

At 308, the controller 214 reads the fan voltage, $V_F$, and determines an input volume flow rate (e.g., in cubic feet per minute). The input volume flow rate is directly proportional to the rotational speed of the condenser fan 136. The rotational speed of the condenser fan 136 is determined from the second voltage, $V_F$. Using known fan laws, the controller 214 determines the input volume flow rate of the condenser fan 136.

At 310, the controller 214 determines a lower limit volume flow rate. The lower limit volume flow rate represents a flow rate, below which the condenser 132 is not receiving sufficient airflow. The controller 214 may compute the lower limit volume flow rate using the reference voltage, VRefcfm. The reference voltage, VRefcfm, may be specified by a supplier of the TRU or an end user. Using fans laws and physical layout of the TRU air path, the controller 214 determines the lower limit volume flow rate. In other embodiments, the lower limit volume flow rate may be stored in controller 214, and does not need to be calculated.

At 312, the controller 214 compares the input volume flow rate to the lower limit volume flow rate. If the input volume flow rate is greater than the lower limit volume flow rate, flow proceeds to 314 where switch 208 remains open. In this condition, airflow over the condenser 132 is sufficient without having to power the condenser fan 136. From 314, the process can return to 302.

If at 312, the input volume flow rate is not greater than the lower limit volume flow rate, flow proceeds to 316. At 316, the controller 214 sends a control signal, Ro, to the switch 208 to close the switch 208. This connects the condenser fan 136 to the condenser fan relay 204. From 316, flow proceeds to 318 where a timer is started. At 320, the process holds in the current condition until the timer expires and flow returns to 302.

Figure 6:
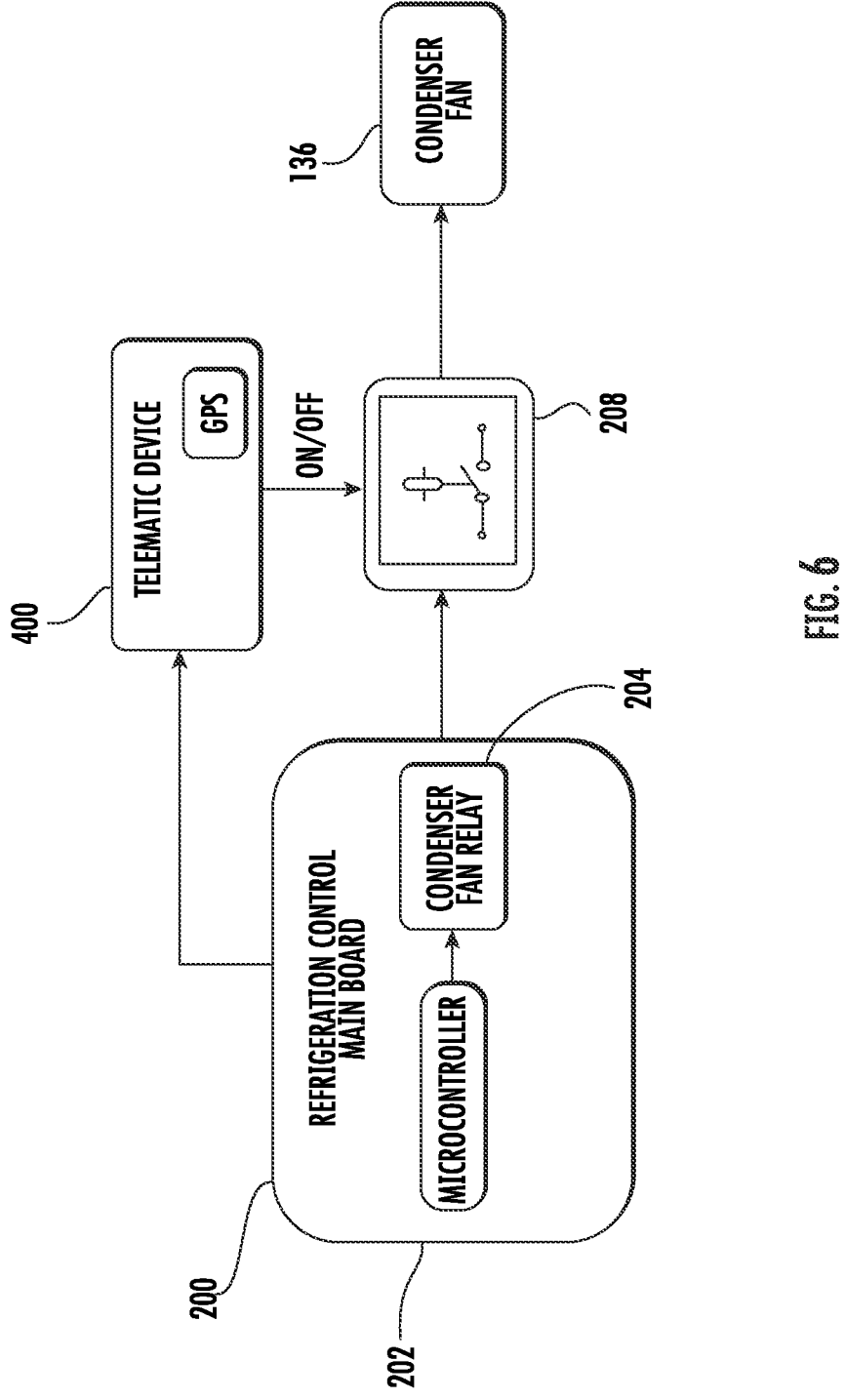
FIG. 6 depicts a system for controlling power to a condenser fan in an example embodiment.

FIG. 6 depicts a system for controlling power to the condenser fan 136 in an example embodiment. The system of FIG. 6 includes the TRU control board 200, the controller 202 and the condenser fan relay 204, as described with reference to FIG. 3. A telematic device 400 uses GPS coordinates of the TRU 130 to locally compute the speed at which the TRU 130 is moving in the telematics device. The direction of travel of the TRU 130 may also be confirmed to be in a direction to cause airflow over the condenser 132. The telematic device 400 controls the switch 208 to disconnect the condenser fan 136 from the condenser fan relay 204 if the vehicle speed of the TRU 130 is sufficiently high to generate required airflow into the condenser 132.

Figure 7:
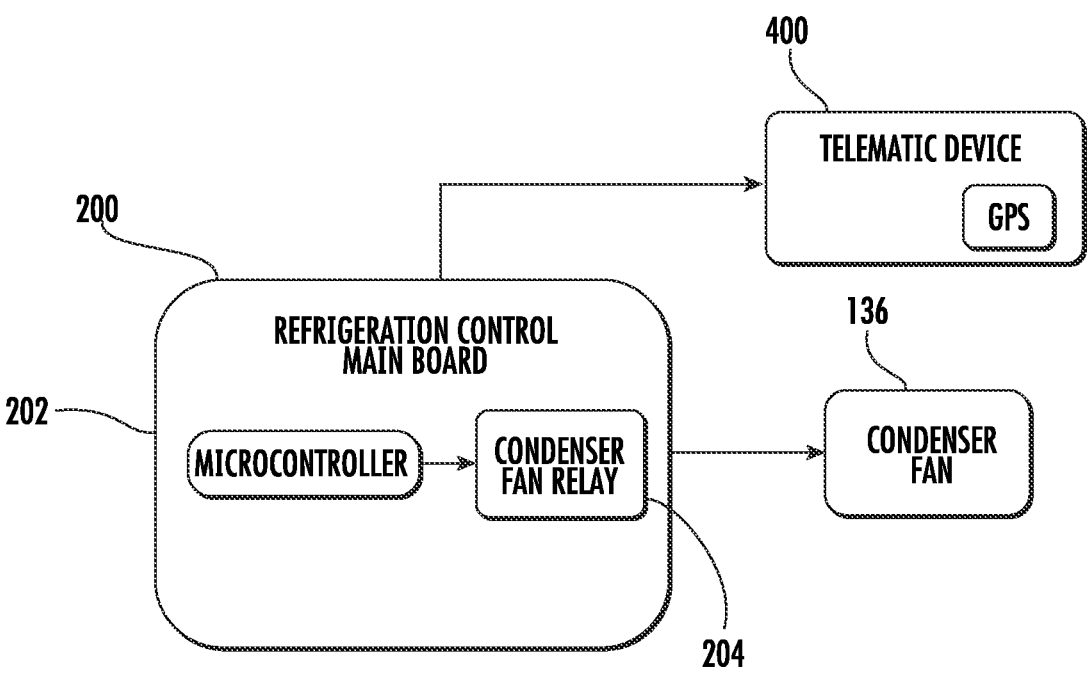
FIG. 7 depicts a system for controlling power to a condenser fan in an example embodiment.

In FIG. 7, depicts a system for controlling power to condenser fan 136 in an example embodiment. In FIG. 7, the telematics device 400 may send the GPS data to the controller 202 and the speed of the TRU 130 can be computed on controller 202. The direction of travel of the TRU 130 may also be confirmed to be in a direction to cause airflow over the condenser 132. After calculating the speed of the TRU 130, the controller 202 may open the condenser fan relay 204 to disconnect the condenser fan 136 from the condenser fan relay 204 if the vehicle speed of the TRU 130 is sufficiently high to generate required airflow into the condenser 132.

Figure 8:
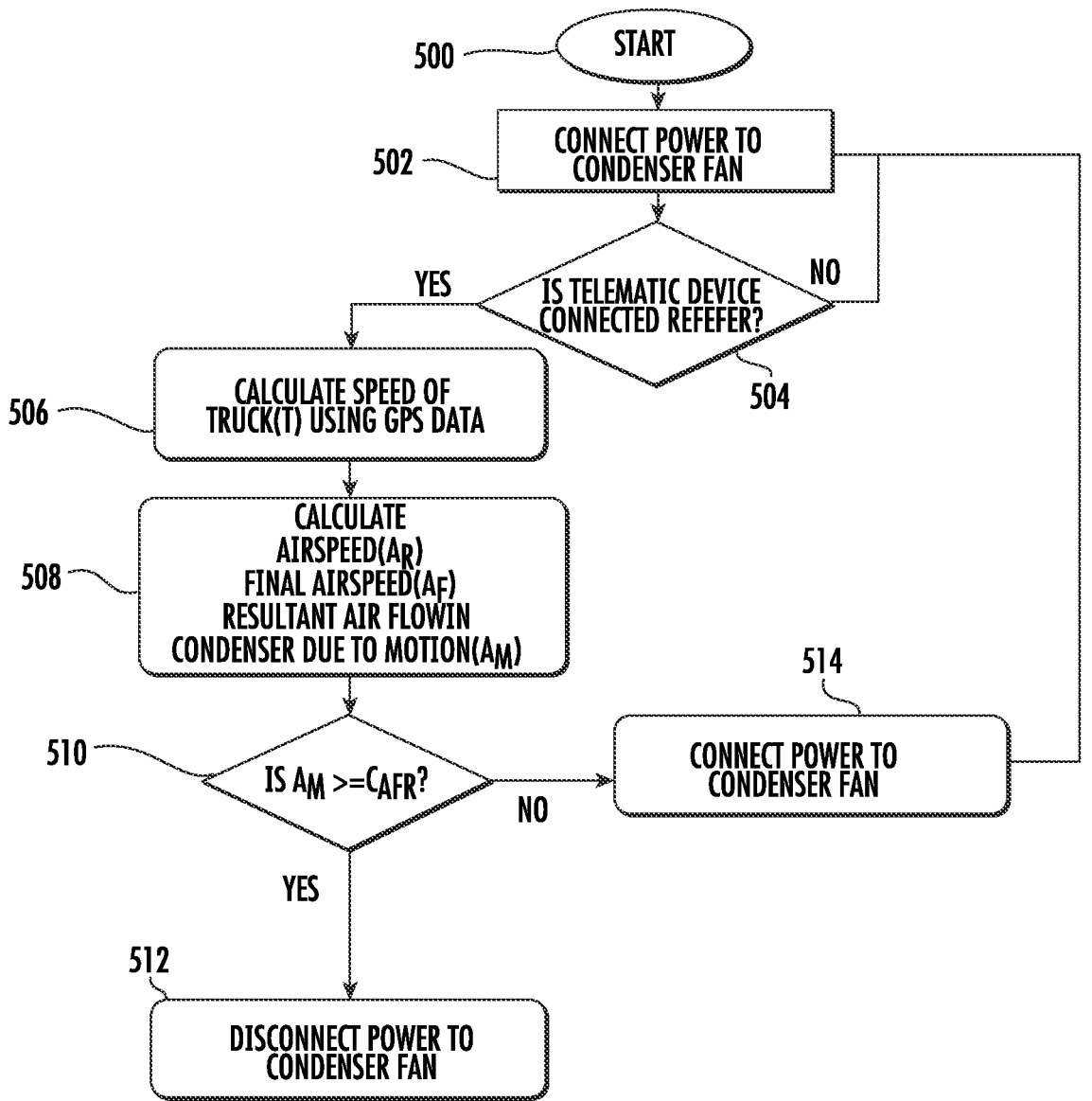
FIG. 8 is a flowchart of a process for controlling power to a condenser fan in an example embodiment.

FIG. 8 is a flowchart of a process for controlling power to the condenser fan in an example embodiment. The process begins at 500 and proceeds to 502 where the switch 208 is closed to connect the condenser fan 136 to the condenser fan relay 204. If no switch 208 is present (see FIG. 7), the condenser fan relay 204 is closed to connect the condenser fan 136 to power through the condenser fan relay 204. Parameters of the TRU 130 may also be obtained at 502. FIG. 9 depicts parameters used in the control process of FIG. 8.

At 504, the controller 202 determines if a telematic device 400 is connected to the controller 202. If not, the process returns to 502. If a telematic device 400 is connected to the controller 202, flow proceeds to 506 where the speed of the TRU 130 is computed based on GPS data from the telematic device 400. This may be performed by the telematic device 400 or the controller 202.

At 508, the telematic device 400 or the controller 202 determines a resultant air flow in condenser due to motion (AM). FIG. 9 depicts parameters used to determine a resultant air flow in condenser due to motion (AM). Some of these parameters will be preprogrammed (e.g., in controller 202) based on the type and configuration of the TRU 130. Using the parameters of FIG. 9, the following equations are used to compute the resultant air flow in condenser due to motion (AM).

$$\text{Airspeed}(A_R) = \text{Truck Speed}(T) \ldots \text{Truck Speed calculated using GPS data Ignoring Windspeed} \qquad \text{Eq. 1}$$

$$\text{Final Airspeed}(A_F) = \text{Airspeed}(A_R) \ast \text{Airspeed loss factor}(Lf) \qquad \text{Eq. 2}$$

$$\text{Resultant Air Flow in Condenser Due to Motion}(A_M) = \text{Final Airspeed}(A_F) \times \text{Duct Cross Sectional Area}(D_A) \qquad \text{Eq. 3}$$

At 510, the telematic device 400 or the controller 202 determines if the resultant air flow in condenser due to motion (A$_M$) is greater than or equal to a nominal condenser fan 136 air flow rating, C$_{AFR}$. If the resultant air flow in condenser due to motion (A$_M$) is greater than or equal to a nominal condenser fan 136 air flow rating, C$_{AFR}$, flow proceeds to 512 where switch 208 is opened (FIG. 6) or condenser fan relay 204 (FIG. 7) is opened. This disconnects the condenser fan 136 from power as motion of the TRU 130 is sufficient to meet airflow requirements over the condenser 132. From 512, the process may return to 504.

If at 510, the resultant air flow in condenser due to motion (A$_M$) is not greater than or equal to the nominal condenser fan 136 air flow rating C$_{AFR}$, flow proceeds to 514 where switch 208 (FIG. 6) is closed or condenser fan relay 204 (FIG. 7) is closed. This connects the condenser fan 136 to power. From 512, the process may return to 504.

Embodiments of this disclosure reduce power consumption of a TRU by disconnecting the condenser fan from power when certain conditions are met. Embodiments provide a low-cost implementation of this method. Embodiments can be easily implemented in existing TRUs.

As described above, embodiments can be in the form of processor-implemented processes and devices for practicing those processes, such as a controller 202 and/or controller 214. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for controlling power to a condenser fan of a transport refrigeration unit (TRU), the method comprising:
   disconnecting power to the condenser fan;
   detecting a fan voltage produced by back emf of the condenser fan;
   obtaining an input volume flow rate corresponding to airflow over a condenser in response to the fan voltage;
   comparing the input volume flow rate to a lower limit volume flow rate;
   maintaining disconnection of power to the condenser fan when the input volume flow rate is greater than the lower limit volume flow rate.

2. The method of claim 1 further comprising connecting power to the condenser fan when the input volume flow rate is not greater than the lower limit volume flow rate.

3. The method of claim 2 further comprising:
   setting a timer after connecting power to the condenser fan;
   upon expiration of the timer, repeating the disconnecting, detecting, obtaining and comparing.

4. The method of claim 1 wherein the lower limit volume flow rate is computed from a reference voltage.

5. The method of claim 1 wherein the lower limit volume flow rate is stored in a memory.

6. A system for controlling power to a condenser fan of a transport refrigeration unit (TRU), the system comprising:
   a condenser fan relay configured to supply power to the condenser fan;
   a switch in electrical series with the condenser fan relay and the condenser fan;
   a controller, the controller configured to perform operations including:
   disconnecting power to the condenser fan by opening the switch;
   detecting a fan voltage produced by back emf of the condenser fan;
   obtaining an input volume flow rate corresponding to airflow over a condenser in response to the fan voltage;
   comparing the input volume flow rate to a lower limit volume flow rate;
   maintaining disconnection of power to the condenser fan by maintaining the switch open when the input volume flow rate is greater than the lower limit volume flow rate.

7. The system of claim 6, wherein the controller is further configured to close the switch connecting power to the condenser fan when the input volume flow rate is not greater than the lower limit volume flow rate.

8. The system of claim 7 wherein the controller is further configured to:
   set a timer after connecting power to the condenser fan;
   upon expiration of the timer, repeating the disconnecting, detecting, obtaining and comparing.

9. The system of claim 6 wherein the lower limit volume flow rate is computed from a reference voltage.

10. The system of claim 6 wherein the lower limit volume flow rate is stored in a memory of the controller.

11. A non-transitory computer program embodied on a computer-readable storage medium, the computer program including instructions for causing a processor to implement a process for controlling power to a condenser fan of a transport refrigeration unit (TRU), the process comprising:
   disconnecting power to the condenser fan;

detecting a fan voltage produced by back emf of the condenser fan;

obtaining an input volume flow rate corresponding to airflow over a condenser in response to the fan voltage;

comparing the input volume flow rate to a lower limit volume flow rate;

maintaining disconnection of power to the condenser fan when the input volume flow rate is greater than the lower limit volume flow rate.

\* \* \* \* \*